United States Patent
Cronin

(10) Patent No.: US 6,901,869 B1
(45) Date of Patent: Jun. 7, 2005

(54) PICKER ASSEMBLY FOR POTATO PLANTER

(75) Inventor: Patrick M. Cronin, West Fargo, ND (US)

(73) Assignee: TerraMarc Industries, Inc., West Fargo, ND (US)

( * ) Notice: Subject to any disclaimer, the term of this patent is extended or adjusted under 35 U.S.C. 154(b) by 0 days.

(21) Appl. No.: 10/704,769

(22) Filed: Nov. 10, 2003

(51) Int. Cl.$^7$ ............................................ A01C 7/04
(52) U.S. Cl. ..................................................... 111/177
(58) Field of Search ............................ 111/77, 78, 34, 111/177, 178, 185, 200; 221/211, 278

(56) References Cited

U.S. PATENT DOCUMENTS

| | | | |
|---|---|---|---|
| 4,008,826 A | * | 2/1977 | Carree ........................ 221/13 |
| 5,009,175 A | | 4/1991 | Pember et al. ............... 111/173 |
| 5,535,689 A | * | 7/1996 | Anderson et al. ........... 111/177 |

OTHER PUBLICATIONS

Lockwood Pick Planter Brochure, admitted prior art, published prior to Nov. 10, 2002.
Harriston Potato Planter Brochure, admitted prior art, published prior to Nov. 10, 2002.

* cited by examiner

Primary Examiner—Robert E Pezzuto
(74) Attorney, Agent, or Firm—Westman, Champlin & Kelly, P.A.

(57) ABSTRACT

A pick assembly for picking potatoes from a supply in a potato planter and moving them to a discharge position includes an arm that supports a plurality of picks that will engage the potatoes. The arm is mounted on a rotating wheel, and the picks are held in the arm with gently tapered bores in the arm and mating gently tapered conical surfaces on the pick that seat together when the pick is installed in the arm. The picks are maintained under axial compression loads to force the mating tapered surfaces together during use.

11 Claims, 3 Drawing Sheets

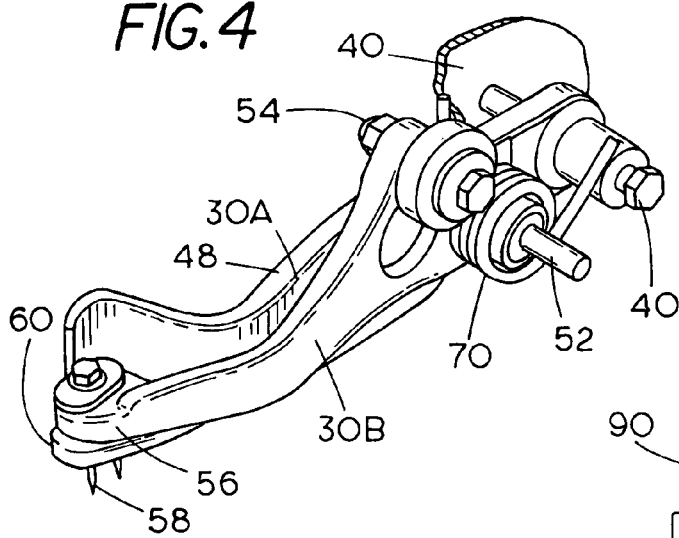
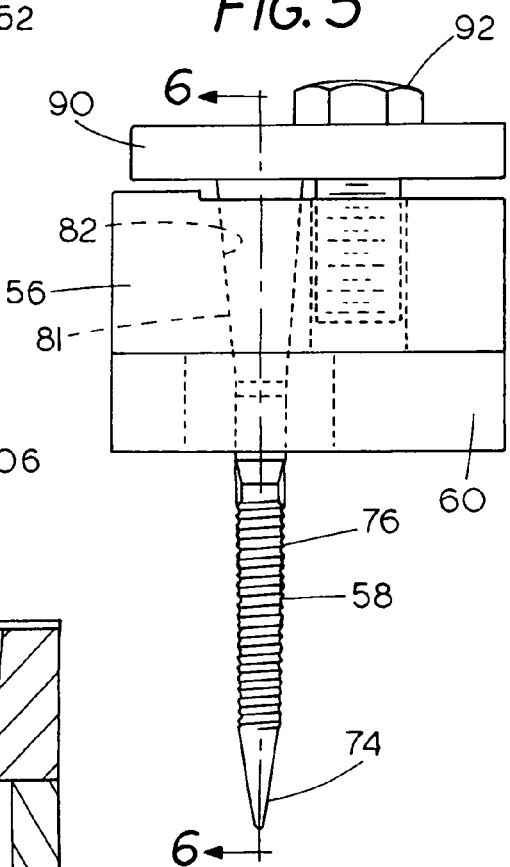
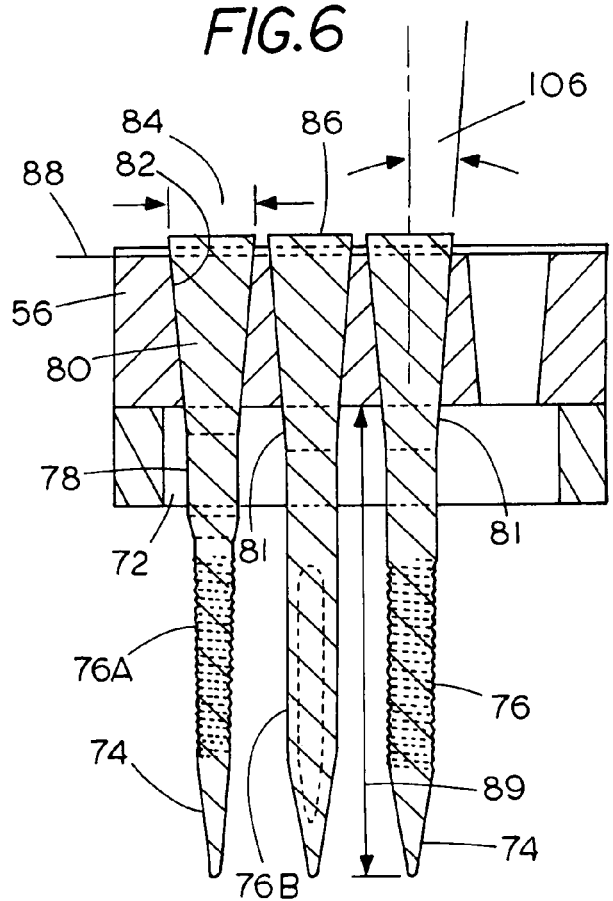

PICKER ASSEMBLY FOR POTATO PLANTER

BACKGROUND OF THE INVENTION

A picker assembly that is used for picking individual pieces of material, such as seed potatoes from a hopper, and carrying them to a position where they are stripped off the individual picks or spears. As shown, the pieces are dropped through a suitable chute to a furrow being prepared by a planter. The picks or spears are carried on an arm and have conical outer surfaces that fit in matching conical bores and are locked in place by applying axial force to the picks. The picks are secured so they do not tend to work loose during use.

The pick assemblies for potato planters are well known and comprise a movable arm carrying the picks and a stationary arm. The arms are mounted on a rotating wheel and the movable arm carrying the picks will move from a position where the picks protrude through an opening in the stationary arm for engaging a seed potato, to a position where it retracts from the stationary arm and the stationary arm acts as a stripper to remove the potato.

In the prior art, rotating wheel potato planters have been well known, which include arms that carry picks, or spear-like sharpened columns or spears that will pierce or penetrate a potato as the wheel moves through a potato supply, with each arm picking up one seed potato and carrying it with the wheel in its path of rotation to a second position where the seed potato will be dropped. The arms that are used include a stationary arm, and a movable pick arm that supports the pick, with the pick protruding through an opening in the movable arm. As the arm set moves through the supply of seed potatoes, the pick pierces a seed potato. When the wheel on which the arms are mounted rotates to the position where the seed potato should be dropped for planting, the movable pick-carrying arm is retracted and the stationary arm of that set acts as a stripper to strip the seed potato from the pick. The movable pick arm then moves back to its position (as it enters the potato supply) with the picks protruding from the stationary arm as the arm set enters the seed potato supply so that the arm set will again pick up a seed potato, which usually is a section of a complete potato.

Various attempts have been made to maintain the picks securely held in the movable picker arm, but the picks continue to loosen and prematurely wear. For example, one prior pick was passed through a straight hole in the arm and it had a countersunk head held in position by a retainer bearing on the pick head with an axial force to seat the countersunk head. This arrangement failed to maintain the pick tightly in position during use. A straight cylindrical hole where the pick head is held down with a set screw that in turn is supported on a bar or cross member carried on the arm and passing over the pick has also been tried but has not proved satisfactory. Retainers of various kinds have been used, but generally they have failed to hold the pick tightly and securely, and yet allow it to be removed relatively easily for replacement when needed.

SUMMARY OF THE INVENTION

The present invention relates to a pick mounting arrangement for a pick arm assembly that has one or more picks or spear-like prongs supported on a movable pick arm, with the pick arm mounted adjacent to a stationary arm, with both the pick arm and the stationary arm supported as a pick arm set on a rotating wheel. The wheel passes through a supply of appropriately sized pieces of material that can be impaled on a pick, such as seed potatoes, the picks protruding through the fixed arm to pierce a single piece of material and carry it with the wheel as the wheel rotates. The pick arm is then actuated to retract from the movable arm in a suitable position during the rotation of the wheel, causing the piece of material, as shown a seed potato, to be stripped from the pick and dropped through a chute to a furrow below the potato planter, in a known way.

The head portion of the picks and the openings or bores for the picks in the pick arm are formed to securely hold the picks in position without permitting them to prematurely loosen or move in their mounting bores. The picks each have a tapered exterior surface that extends along a tapered mounting head of the pick that is supported in the pick arm throughout substantially the entire length of the bore in the pick arm. The bore in the pick arm is formed with a mating taper, or cone shape, and the picks are made so the top of the pick head will protrude above the surface of the arm opposite from the side where the picks project. When the tapered head end is seated in the bore, a clamp or lock, as shown, is then placed over the top end of the head of the picks and tightened down against the top end of the head of the pick to provide a longitudinal axial force on the end of the pick and force the exterior tapered surface of the mounting head of the pick and the mating tapered interior surface of the bore in the pick arm to seat tightly, and thus be held securely.

The length of the taper on the mounting head and bore, which preferably is a majority of the way through the support bar and the relatively shallow cone angle, ensures that the pick will lock into position with the sharpened end that spears or pierces the seed potatoes projecting out. The pick is held securely from side loads and other loads that have caused loosening in the past. The support bars shown are generally $5/16$ to $3/8$ inches thick.

If the picks are to be replaced, the clamp bar or lock bar can be removed and the picks driven out in an opposite direction from the tightening direction to unseat the tapered surfaces.

BRIEF DESCRIPTION OF THE DRAWINGS

FIG. 4 is a schematic view of a pick arm set viewed from an opposite side of the rotating wheel shown in FIG. 3;

FIG. 5 is an end view of a pick arm and stationary arm of a pick arm set in a position with the picks protruding through the stationary arm;

FIG. 6 is a sectional view taken along line 6—6 in FIG. 5.

DETAILED DESCRIPTION OF THE PREFERRED EMBODIMENTS

Figure 2:
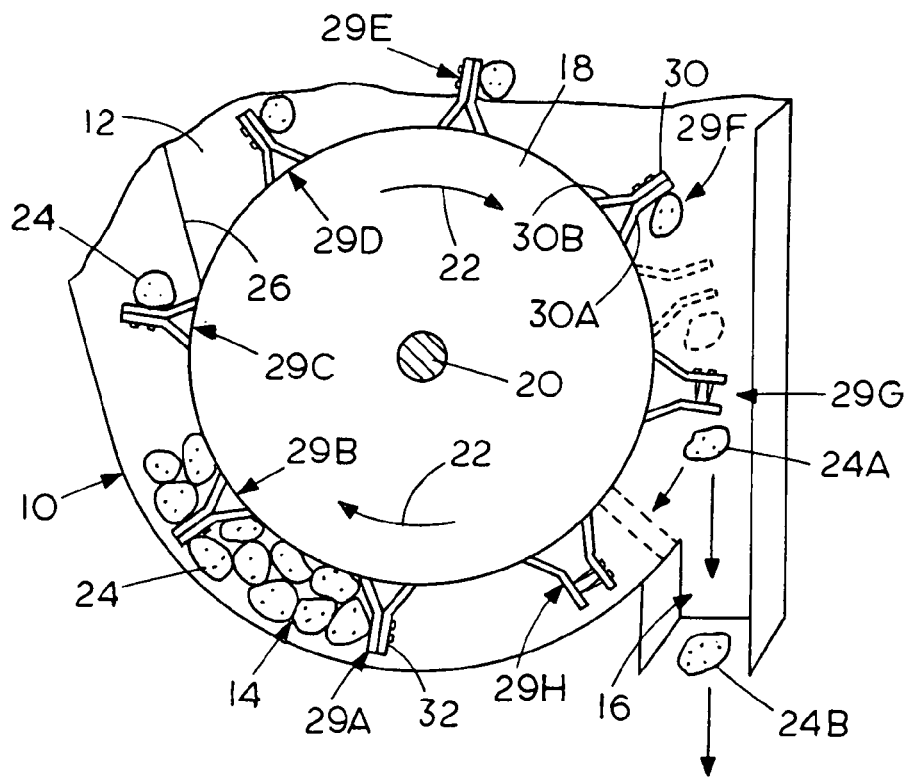
FIG. 2 is a schematic side view of a typical potato planter wheel showing a sequence of positions of a pick arm set comprises a movable pick arm and a stationary arm for planting potatoes.
Figure 3:
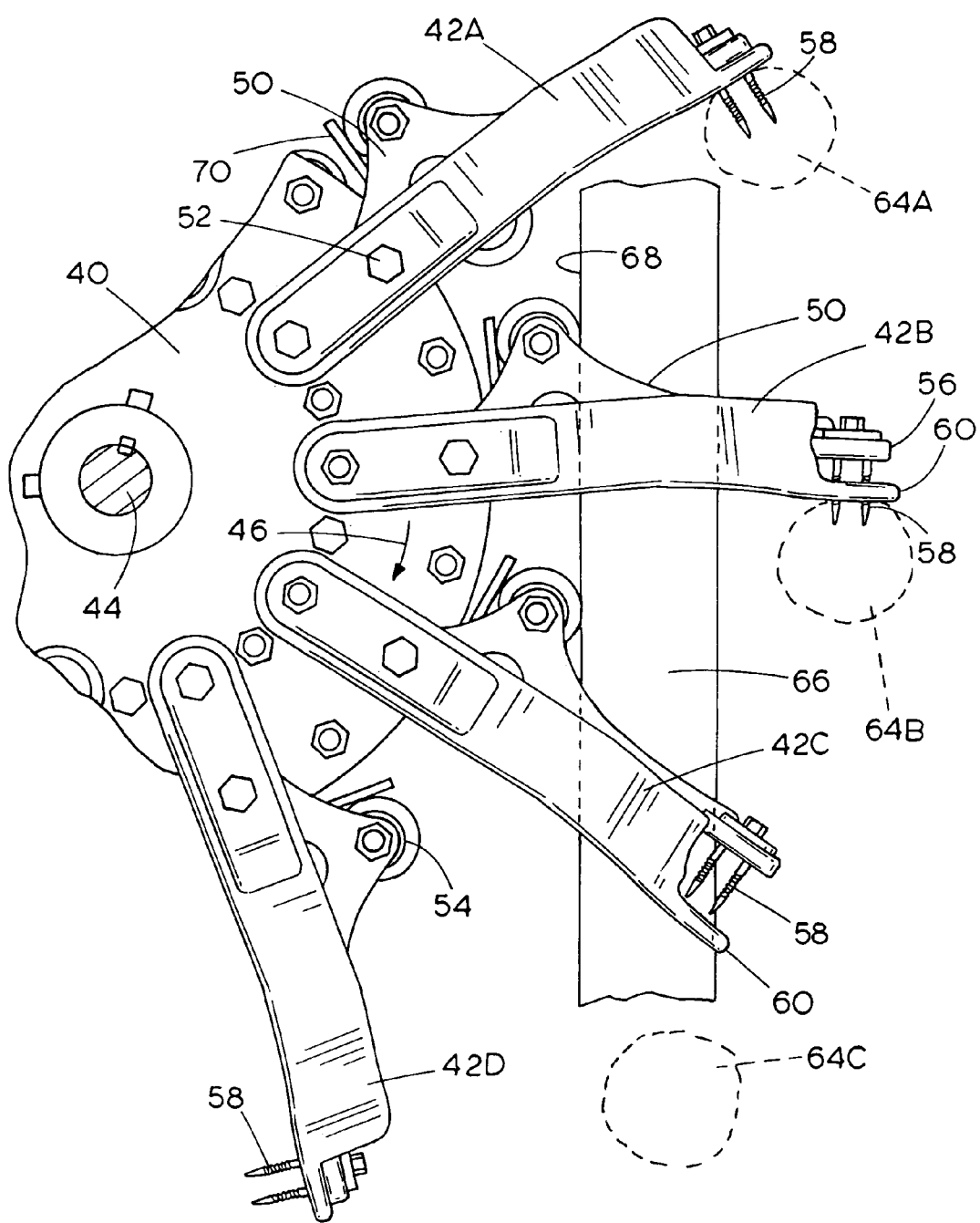
FIG. 3 is a fragmentary schematic perspective view of a potato planter wheel having pick arm sets made according to present invention installed thereon.

Referring first to FIGS. 2, 3 and 4, a potato planter 10 is shown only schematically, and by way of example only for orientation. The potato planter 10 has a housing 12, with a potato supply chamber 14. The housing 12 has a potato outlet chute 16 that leads to a suitable transfer tube and then down to the ground where the potato will be dropped into a furrow being formed by disks in a conventional manner. The housing 12 mounts a potato pick wheel 18, which is driven from a suitable drive through a shaft 20, and is rotated in the direction as indicated by the arrows 22. The seed potatoes shown at 24 in the potato supply chamber 14 are such that the wheel and thus the pick arms will rotate through this potato supply. A diverter wall 26 is used for keeping the supply of potatoes 24 in a desired location.

The pick wheel 18 has a plurality of seed potato pick arm sets or assemblies 30 that are shown only schematically in FIG. 2. The potato pick arm sets or assemblies 30 have two arms, including a non-movable or stripper arm 30A and a movable pick arm 30B in each of a plurality of positions on the wheel indicated at 29A–29H. The term "stationary" means the arm is fixed in position relative to the planter pick wheel, but the arms do move with the wheel relative to the housing 12. The planter 10 is provided with a cam control to cause the pick arm 30B of each set to be moved away from the stripper arm and return toward the stripper arm under a spring load.

For example, when the movable pick arm and the stripper arm are together, picks 32, which are slender, sharpened spears that are carried by the movable pick arm 30B, will protrude through the associated fixed arm, or stripper arm 30A, as shown in FIGS. 4, 5, and 6. In position 29A, the protruding ends of the pick or picks (four picks are provided) will engage seed potatoes 24 as the wheel rotates and the pick arm sets or assemblies 30 enter the supply chamber 14 and engage seed potatoes 24 in the supply.

As shown schematically at position 29B, the arm sets move through the supply and pick up an individual seed potato (a section of a larger potato) such as that at wheel position 29C. The potatoes remain impaled on the picks and are carried around to wheel position 29F, and then a cam will start to move the movable pick arm 30B away from the stationary arm or stripper arm. A partially separated pick arm is indicated by the lines between station 29F and 29G, and when the arm set is at station 29G directly above the discharge chute 16, the pick arm will have been retracted or moved to a position so that the picks 32 will have been stripped away from the seed potato and the potato will fall as shown by potatoes 24A and 24B.

When at station 29H, the cam has started to release the movable pick arm and a spring load is provided to return the movable arm to position adjacent the stationary or stripper arm.

The picks 32 are prongs or spear-like members that are sharp and will spear a piece of material that can be impaled, such as a seed potato, a piece of a vegetable or other items that can be impaled as the pick arm moves through the supply. The piece of material, as shown a seed potato is carried along as described until a movable picker arm is cammed away from the fixed or stripper arm and the piece of material is stripped off the pick or picks. In FIG. 3, separate numbering is used but the positioning of the parts is substantially the same as shown in FIG. 2 schematically. In FIG. 3 a potato planter pick wheel 40 has a number of stripper arms 42A, 42B, 42C, and 42D fixed to the wheel by way of illustration. The arms are bolted to the wheel 40 and the wheel is driven by powering a shaft 44 and rotating the wheel in the direction indicated by arrow 46. Thus, the arms 42A–42D are stationary relative to the wheel 40, but move with the wheel relative to the housing 12.

In FIG. 4, the fixed arm 42 is shown on the pick wheel 40. Bolts 49 and 52 are used for fastening the inner end of the fixed arm 42 to the wheel 40. Bolt 52 has an end for pivotally mounting the base end of the movable pick arm 50. The movable pick arm 50 has an extension with a cam follower roller 54 rotatably mounted thereon. The movable arm extends out past the periphery of the wheel. A pick support plate 56 is formed at the outer end of the movable pick arm 50. The pick support plate 56 supports a plurality of individual picks or spears 58 (there are support bores for four picks), that are mounted according to the present invention. The picks 58 pass through an opening in a stripper platform 60 at the outer end of the fixed or stripper arm 42 and sharpened ends protrude from the arm 42.

Schematically shown in FIG. 3 is the action of the picks 58 as carried by the movable arms. In position 42A, the picks are piercing or spearing and holding a seed potato 64A for transport to the position 42B, where the cam roller 54 of the associated movable pick arm 50 at the position 42B will have engaged a surface 68 of a stationary cam shown schematically at 66. The cam surface 68A causes the movable pick arm to pivot about the pivot bolt 52. At station 42B, it can be seen that the pick support plate 56 of the movable pick arm has been retracted from the stripper plate 60, and the picks 58 for that pick arm have been withdrawn from the seed potato 64B.

When the pick arm sets have traveled to the position shown at 42C, the cam 66 will have retracted the movable pick arm 50 fully, so the picks 58 are completely withdrawn from the seed potato and stripper plate 60, and the seed potato shown at 64C will be falling freely down to the planting chute and into the furrow below.

The cam 66 then releases the cam rollers and a torsion spring 70 (see FIG. 4) is used to return the movable pick toward the stripper plate 60 to a home or start position. The movable pick arm 50 is thus snapped back to its position with the pick support plate 56 against the stripper plate 60, and with the picks 58 protruding from the stripper plate. The torsion spring 70 is mounted over pivot bolt 52 and has ends that rest on mounting bolt 49 and on the mounting of the cam roller.

The present invention is directed to the mounting of the individual picks 58, in the manner shown in FIGS. 5 and 6. In FIG. 5, the stripper plate 60 and the pick support plate 56 of the movable arm 50 are illustrated separately. More than one row of picks can be used, but in the showing in FIGS. 5 and 6, there are places for four picks in a row in the pick support plate 56. One pick has been removed to show a mounting bore.

As shown, the sharpened ends of the picks 58 protrude below the stripper plate portion 60 of the stripper arm 42, through a large opening or slot 72. The picks 58 have tapered or sharpened points 74, and exposed shank lengths 76 and 76A that can be threaded or roughened in some manner, if desired, to increase the friction with the seed potato that has been speared by the pick. A circular cylindrical portion 78 extends through the opening 72. The shank can be reduced in diameter and roughened or threaded as shown by shank 76A or smooth, as shown at 76B.

The picks 58 each have a conically tapered, elongated mounting head portion 80. The mounting head portions 80 have a very gentle taper angle on their outer surface 81.

The tapered mounting head 80 is of length so that it will pass substantially all the way through a correspondingly conically tapered bore or opening 82 in the pick support plate 56, as shown. The elongated tapered mounting head 80 is made so that the head top end diameter dimension indicated at 84 in FIG. 6 is greater than the dimension of the opening 82 at the top surface of the pick support plate 56.

Also, the axial length of the tapered mounting head 80 is preferably greater than the axial length of the bores 82 that receive the mounting heads. That leaves a protrusion of the flat upper or top surface 86 of each of the picks above the surface 88 that is the top of the pick support plate. The difference in dimension between the top end of the tapered bore 82 at surface 88 and the top end of the pick mounting heads may be in the range of 0.010 inch.

The difference in size is enough so that the end surfaces of the mounting heads protrude upwardly above the surface 88, and a clamp bar 90 is put into place overlying the top surfaces 86.

One side of the clamp bar 90 rests on a raised boss 91 and the bar is clamped tightly with a suitable strength cap screw 92. A high compression force is provided axially along the picks to force the tapered outer surfaces of the heads of the picks against the conical surfaces of the bores 82. The result is a frictional seating and preferably having support along substantially the entire thickness or axial height of the pick support plate 56 to resist fretting or movement.

Figure 1:
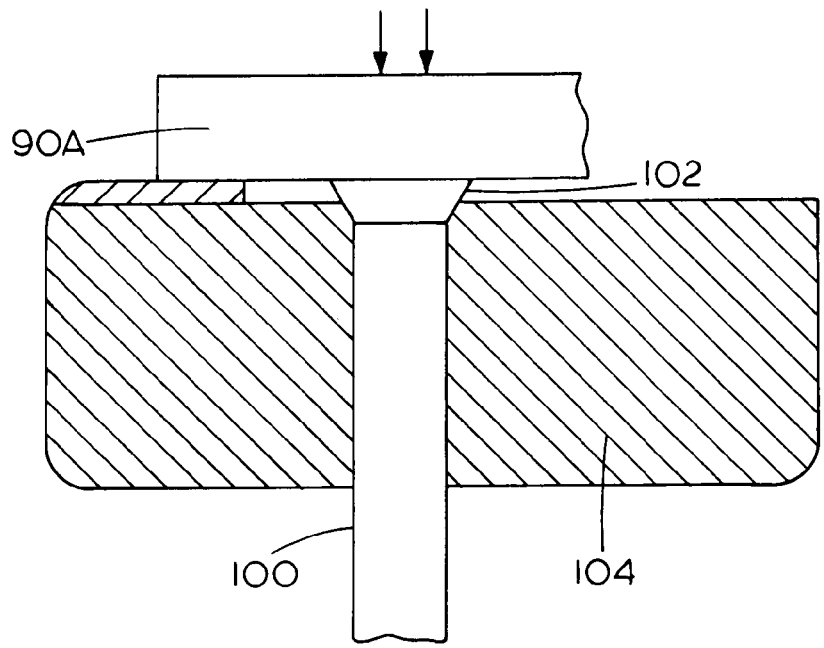
FIG. 1 is a fragmentary sectional view at the end of a picker arm showing a prior art mounting for picks in such arm.

This long, gentle taper of the mounting head is distinguished from the showing in FIG. 1, where a head is countersunk at a substantial angle, for example 60 degrees, and then an attempt is made to seat the pick head. The prior art pick 100 in FIG. 1 is shown with the countersunk head 102. It can be seen that the countersunk angle permits only a short taper for the countersunk head against which force can be axially applied, using a clamp bar such as 90A or a set screw bearing on each pick. The round or cylindrical hole for the major portion of the shank of the prior art pick in FIG. 1, that passes through the pick support arm 104, has to be slightly larger than the pick so it can be slid into place. The clearance will permit play or relative movement as the seed potatoes are engaged and dropped. This will cause premature wear, premature looseness and problems in operation thank with the present invention.

The movable arm or pick support arm 50 can be cast material and machined to provide for the pivot housing and the tapered bores 82, and the picks themselves can be made of any suitable material including hardened tips, if desired.

While potatoes have been shown as the example for use of this type of a picker, other materials can be handled in the same manner where they are used for individual picking up and dispensing. Vegetables, such as carrots, and many root crops can be handled with this type of a pick and can be used on rotating wheels for picking pieces from a storage and moving and dropping such pieces at a desired location.

The taper angle of the conical surface of the mounting head is about a minimum of two degrees, but preferably less than ten degrees. A preferred taper is three degrees measured from the central longitudinal axis as shown in FIG. 6 at 106. The included angle thus can be below twenty degrees with the most preferred included angle at six degrees.

The pick length is a factor in the length of the conical seating surfaces that are needed. The length of the conical portion of the head of the pick is at least one half of the diameter 84 of the base end of the conical head. The base is where the conical taper starts. The cone length then will securely support a pick. The pick protrudes from the support plate 56 an amount shown by the double arrow 89 in FIG. 6, and at the conical and axial length angle as described, the pick will be secure from side loads on the protruding portion.

This means that the tapered head does not need to extend out of the support plate 56 as shown in the preferred embodiment. It will still be secure if the conical length is properly proportioned and kept at the cone angles described. The tapered bore of the cone head of the pick does not extend through the support plate 56. The bore ends in a cylindrical bore portion at the lower or inner end. The pick can have a short length of cylindrical shank such as that shown at 78 in the cylindrical portion of the support plate bore.

Again, the extension of the pick from the support plate affects a moment that needs to be resisted by the support of the conical head. Thus, a conical support substantially the entire thickness of the support plate is desired, and preferably the conical head will protrude through the support plate. This insures securing the pick in place, and also makes installation easy.

Although the present invention has been described with reference to preferred embodiments, workers skilled in the art will recognize that changes may be made in form and detail without departing from the spirit and scope of the invention.

What is claimed is:

1. A pick for picking up individual pieces of vegetable material wherein a pick arm is moved through a supply of pieces of vegetable material to cause picks mounted thereon to spear a piece of vegetable material and carry it along a path of movement, the improvement comprising a mounting for the pick to a pick arm, the improvement including an axially elongated cone-shaped mounting head portion on the pick at a mounting end of the pick, and of axial length to extend into a mating cone-shaped bore in a pick arm and seat along a majority of the axial length of such bore.

2. The pick of claim 1, wherein the axial length of the cone shaped mounting head portion that seats in the bore is at least one half of a diameter of a base end of the cone shaped mounting head portion from a pick arm in which it is installed.

3. The pick of claim 2 in combination with a pick arm having the bore to form a pick assembly, the mounting head portion of the pick being of length to protrude above a surface of the arm in which an inlet end of the bore in the pick arm is formed, with the cone shaped head portion having a tapered surface seated against a tapered surface of the bore, and a clamp for clamping the pick axially into the bore in the pick arm to provide a force seating the tapered surface of the pick against the tapered surface of the bore.

4. The pick assembly of claim 3, wherein said pick has a sharpened end that extends from the pick arm in an opposite direction from which the inlet end of the bore is formed.

5. The pick of claim 1, wherein the taper of the cone shape on the mounting head portion of the pick is substantially three degrees measured from a central axis of the pick.

6. The pick assembly of claim 3, wherein there is a stripper arm mounted adjacent the pick arm, said stripper arm having an opening through which the picks protrude in a position for picking up a piece of the spearable material.

7. The pick assembly of claim 6, wherein said pick arm is mounted on the stripper arm, and is pivotally mounted relative thereto to move the pick from a position with the pick protruding from the stripper arm to a position wherein the pick is retracted relative to a surface of the stripper arm.

8. A mounting for a pick used for engaging vegetable pieces in a planter and moving the vegetable pieces to a desired location comprising an elongated pick having a mounting head, a shank having a length extending from the mounting head to a sharpened end, the mounting head having a base end forming a diameter for a cone having an exterior surface conically tapered throughout its axial length, and the conical tapered surface length being at least from the base end tapering inwardly toward a central axis of the shank and of the conically tapered surface and being at least one half of the diameter of the base.

9. The mounting of claim 8, wherein the mounting head is adapted for mounting in a bore through a support plate around a central axis, the axial length of the conically tapered exterior surface of the mounting head of the pick being greater than a thickness of the support plate, and the base end of the conically tapered surface extending out of such bore when the pick is mounted.

10. The mounting of claim 9, wherein an angle of conical taper of the mounting head is below 6 degrees measured from the central axis of the shank.

11. The mounting of claim 9 and a clamp bar mounted on the support plate and overlying the base of the mounting head, the clamp bar exerting a force urging the mounting head into the bore.

* * * * *